United States Patent
Gamage et al.

(10) Patent No.: US 10,047,272 B2
(45) Date of Patent: Aug. 14, 2018

(54) TREATMENT FLUIDS FOR REDUCING SUBTERRANEAN FORMATION DAMAGE

(71) Applicant: Halliburton Energy Services, Inc., Houston, TX (US)

(72) Inventors: Pubudu H. Gamage, Katy, TX (US); Cato Russell McDaniel, Montgomery, TX (US); William Walter Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/415,461

(22) PCT Filed: Mar. 28, 2014

(86) PCT No.: PCT/US2014/032130
§ 371 (c)(1),
(2) Date: Jan. 16, 2015

(87) PCT Pub. No.: WO2015/147852
PCT Pub. Date: Oct. 1, 2015

(65) Prior Publication Data
US 2015/0361323 A1    Dec. 17, 2015

(51) Int. Cl.
*E21B 43/16* (2006.01)
*C09K 8/52* (2006.01)
(Continued)

(52) U.S. Cl.
CPC ............... *C09K 8/52* (2013.01); *C09K 8/035* (2013.01); *C09K 8/602* (2013.01); *E21B 7/00* (2013.01); *E21B 43/16* (2013.01)

(58) Field of Classification Search
CPC .................................. E21B 43/16; E21B 33/00
See application file for complete search history.

(56) References Cited

U.S. PATENT DOCUMENTS

| | | | | |
|---|---|---|---|---|
| 4,296,812 A | * | 10/1981 | Kalfoglou | C09K 8/60 166/270.1 |
| 5,501,276 A | | 3/1996 | Weaver et al. | |

(Continued)

FOREIGN PATENT DOCUMENTS

| | | |
|---|---|---|
| CA | 2685607 A1 | 11/2008 |
| EP | 0531269 A2 | 3/1993 |

(Continued)

OTHER PUBLICATIONS

Dag C. Standnes, Tor Austad "Wettability alteration in chalk Mechanism for wettability alteration from oil-wet to water-wet using surfactants" Journal of Petroleum Science and Engineering 28 2000. 123-143.*

(Continued)

*Primary Examiner* — William D Hutton, Jr.
*Assistant Examiner* — Charles R Nold
(74) *Attorney, Agent, or Firm* — McDermott Will & Emery LLP

(57) ABSTRACT

Methods including providing a treatment fluid comprising a base fluid, a wettability altering surfactant, and a chelating agent, wherein the treatment fluid has a pH of at least about 5; introducing the treatment fluid into a subterranean formation; altering a wettability of the subterranean formation from oil-wet to either mixed-wet or water-wet with the wettability altering surfactant; and complexing metal ions in the subterranean formation with the chelating agent.

6 Claims, 1 Drawing Sheet

(51) Int. Cl.
*C09K 8/035* (2006.01)
*E21B 7/00* (2006.01)
*C09K 8/60* (2006.01)

(56) References Cited

U.S. PATENT DOCUMENTS

| | | | |
|---|---|---|---|
| 6,156,116 A | 12/2000 | Lee et al. | |
| 6,380,149 B2* | 4/2002 | Flynn | C07C 43/12 |
| | | | 134/40 |
| 6,395,848 B1* | 5/2002 | Morgan | C08F 14/26 |
| | | | 523/203 |
| 6,435,277 B1* | 8/2002 | Qu | C09K 8/68 |
| | | | 166/281 |
| 6,641,986 B1 | 11/2003 | Zhang et al. | |
| 8,148,303 B2 | 4/2012 | Van Zanten et al. | |
| 8,210,263 B2 | 7/2012 | Quintero et al. | |
| 2006/0102349 A1 | 5/2006 | Brady et al. | |
| 2008/0035339 A1* | 2/2008 | Welton | C09K 8/68 |
| | | | 166/279 |
| 2009/0281241 A1* | 11/2009 | Brothers | C08F 6/16 |
| | | | 524/758 |
| 2010/0270020 A1* | 10/2010 | Baran, Jr. | C09K 8/80 |
| | | | 166/305.1 |
| 2011/0071056 A1* | 3/2011 | Saini | C09K 8/035 |
| | | | 507/119 |
| 2012/0055668 A1* | 3/2012 | Wu | C08G 18/0823 |
| | | | 166/250.01 |
| 2012/0145401 A1* | 6/2012 | Reyes | C09K 8/78 |
| | | | 166/305.1 |
| 2012/0181019 A1 | 7/2012 | Saini et al. | |
| 2012/0279711 A1 | 11/2012 | Collins et al. | |
| 2013/0037274 A1* | 2/2013 | Crews | C09K 8/536 |
| | | | 166/376 |
| 2013/0081808 A1* | 4/2013 | Zeidani | C09K 8/592 |
| | | | 166/272.4 |
| 2013/0269932 A1* | 10/2013 | Dams | C09K 8/035 |
| | | | 166/250.01 |
| 2014/0090849 A1* | 4/2014 | Crews | C09K 8/582 |
| | | | 166/308.2 |
| 2015/0083397 A1* | 3/2015 | Monroe | E21B 41/02 |
| | | | 166/244.1 |
| 2015/0329701 A1* | 11/2015 | Tsuda | C08L 71/02 |
| | | | 524/376 |
| 2016/0009981 A1* | 1/2016 | Teklu | E21B 43/20 |
| | | | 166/305.1 |

FOREIGN PATENT DOCUMENTS

| | | |
|---|---|---|
| WO | 201150060 A2 | 4/2011 |
| WO | 2013-096108 A1 | 6/2013 |
| WO | 2015147852 A1 | 10/2015 |

OTHER PUBLICATIONS

P.D. Berger et al. "Ultra-low Concentration Surfactants for Sandstone and Limestone Formations" SPE 75186 Apr. 2002.*
Silwet L77 Material Safety Data Sheet Apr. 23, 2012.*
Wei et al. "Molecular Design and Fractal Applications in Enhancing Oil Recovery From Low-Permeability Oil Reservoirs by Gemini Surfactant Flooding", SPE 132743, Jun. 2010, 2 pages.*
Wei "Molecular Design Synthesis and Simulation on a Novel Gemini Surfactant for EOR from Low Permeability Reservoirs" SPE 160854, Apr. 2012, 2 pages.*
Menter et al. "Gemini Surfactants" Angew. Chem. Int. Ed. 2000, 39, 1906-1920.*
Belkin et al., Enhanced Oil Recovery: $CO_2$ Foam Flooding, 1st Annual Report, New Mexico State U, pp. 1-66, 1980.
Goddard, "Cost Effective Surfactant Formulations for Improved Oil Recovery in Carbonate Reservoirs," California Institute of Technology, 2006.
Perry, "Silicone Surface-Active Agents," Dow Corning Corporation, 2005.
Sawyer, "Metal-Gluconate Complexes," University of California, Department of Chemistry, 1964.
Sekhon, "Gemini (Dimeric) Surfactants," Resonance, Mar. 2004, pp. 42-49.
Menger et al., "Gemini Surfactants: A New Class of Self-Assembling Molecules," J.Am. Chem. Soc. 1993, 115, pp. 10083-10090.
Linville (ed), "Contracts for Field Projects and Supporting Research on Enhanced Oil Recovery and Improved Drillling Technology," U.S. Department of Energy, 1982.
King et al, "Annual Resources Report," Energy and Minerals Department, 1982.
International Search Report and Written Opinion for PCT/US2014/032130 dated Dec. 11, 2014.

* cited by examiner

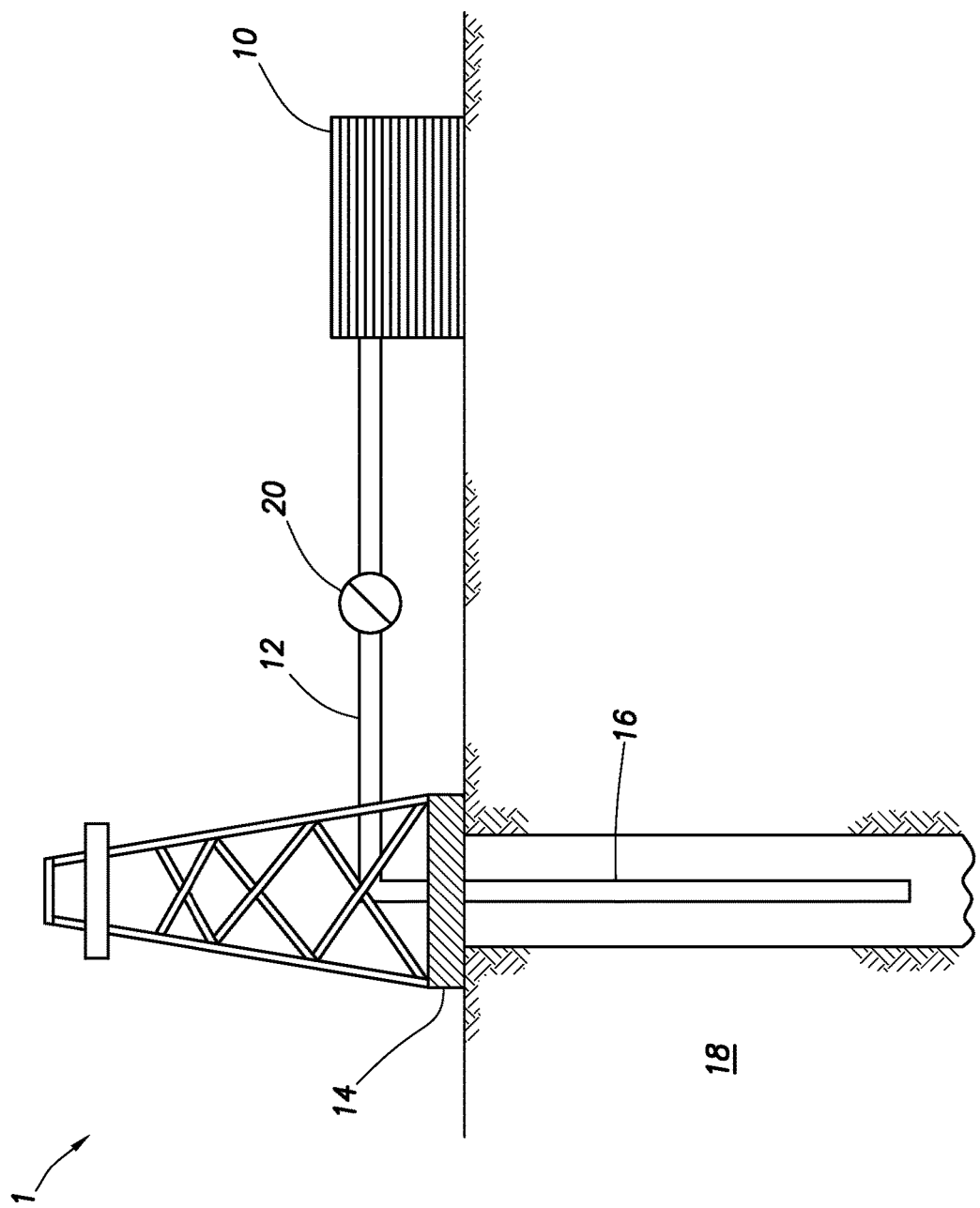

TREATMENT FLUIDS FOR REDUCING SUBTERRANEAN FORMATION DAMAGE

BACKGROUND

The present disclosure generally relates to treatment fluids for reducing subterranean formation damage, and, more specifically, to treatment fluids capable of reducing subterranean formation damage by altering the wettability of a formation while simultaneously complexing metal ions therein.

Treatment fluids may be used in a variety of subterranean treatment operations. Such treatment operations may include, without limitation, drilling operations, completion operations, stimulation operations, production operations, remediation operations, sand control operations, and the like. As used herein, the term "treatment," and all of its grammatical variants (e.g., "treat," "treating," and the like), refers to any subterranean formation operation that employs a fluid in conjunction with achieving a desired function and/or for a desired purpose. Use of these terms does not imply any particular action by the treatment fluid or a component therein, unless otherwise specified herein. More specific examples of illustrative treatment operations may include, but are not limited to, hydraulic fracturing operations, gravel packing operations, acidizing operations, scale dissolution and removal operations, consolidation operations, and the like.

During treatment operations, the subterranean formation being treated may experience formation damage. As used herein, the terms "formation damage" or "damage," and all of their grammatical variants, refer to a reduction in the permeability of the formation in the near wellbore region. Because formation damage may occur during various treatment operations, such damage may accordingly arise at various stages of the lifecycle of the formation. However, damage during drilling operations where a drill bit abrades the formation to form a wellbore therein may be particularly pronounced. Formation damage during drilling may be caused by a number of mechanisms including, for example, saturating the formation in the near wellbore region with fluids (e.g., aqueous fluids) from drilling fluids due to fluid loss, altering the wettability of the formation to oil-wet due to interactions with drilling fluid additives such that the formation preferentially imbibes oil, blocking the pore throats of the formation with solids or other precipitated compounds (e.g., metal ions) from drilling fluids and/or the formation, and the like.

During production of a wellbore in a subterranean formation (e.g., hydrocarbon production), formation damage may be particularly undesirable as the highest pressure drops during production occur at the damaged near wellbore region. The damage causes a positive skin factor, or increased flow resistance, in the near wellbore region, which may reduce the productivity index of the wellbore (i.e., the ability of a reservoir in the formation to deliver fluids to the wellbore). Such a reduction in the productivity index may translate directly into economic costs for a wellbore operator, in terms of reduced fluid recovery (e.g., hydrocarbons), costly remedial operations such as expensive well stimulations, increased operator work time associated with remedial operations, and the like.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 shows an illustrative schematic of a system for delivering fluids described herein to a downhole location, according to one or more embodiments.

DETAILED DESCRIPTION

The present disclosure generally relates to treatment fluids for reducing subterranean formation damage, and, more specifically, to treatment fluids capable of reducing subterranean formation damage by altering the wettability of a formation while simultaneously complexing metal ions therein.

The treatment fluids of the present disclosure may be used during treatment operations in a subterranean formation to combat formation damage during the operation itself. That is, the treatment fluids described herein may prevent or reduce formation damage while the treatment fluid is in use, and after its use as well (e.g., preventing or reducing emulsion blockages from later forming), thereby preventing or reducing the need to remediate the formation damage after a treatment operation is completed and correspondingly reducing the costs typically associated with the accumulation of formation damage. Specifically, the treatment fluids are desirably capable of favorably altering the wettability of a formation, while simultaneously complexing metal ions to prevent their precipitation in the formation. As used herein, the term "complexing," and all of its grammatical variants (e.g., "complex," "complexation," and the like) refers to the formation of a metal-ligand bond. Such metal-ligand bonds may effectively sequester problematic metal ions, such that they are substantially unable to undergo further reactions to produce metal-containing precipitates that may result in formation damage. As used herein the term "substantially unable" refers to a situation wherein, after treatment, any problematic metal ions are largely but not necessarily wholly unable to undergo further reactions.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having the benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, the present disclosure provides a treatment fluid composition comprising a base fluid, a wettability altering surfactant, and a chelating agent. The treatment fluids described herein may have a pH of at least about 5. In some embodiments, the treatment fluids may have a pH from a lower range of about 5, 6, 7, 8, or 9 to an upper range of about 12, 11, and 10. Some preferable embodiments may exhibit a pH in the range from about 5 to about 12, from about 7 to about 12, or from about 9 to about 12. Accordingly, the treatment fluids described in the present disclosure may be particularly effective in subterranean formations at basic pH ranges, where many traditional surfactants and/or chelating agents have been ineffective. For example, traditional chelating agents, such as ethylenediaminetetraacetic acid ("EDTA"), demonstrate an approximate 14 order of magnitude reduction in stability, and thus functionality, when increasing pH from 2 to 12.

The treatment fluids described herein may be introduced into a subterranean formation, wherein the wettability altering surfactant may alter the wettability of the formation to mixed-wet or water-wet from oil-wet and the chelating agent may complex metal ions in the formation. Both of the wettability altering surfactant and the chelating agent may operate independently of one another. That is, the wettability altering surfactant may shift to relative permeability curve of the formation, thereby increasing hydrocarbon permeability and the chelating agent may dissolve precipitates formed by divalent cations (e.g., complexing metal ions, such as those in a filter cake, as discussed below). In some instances, however, the combination of both the wettability surfactant and the chelating agent in a single treatment fluid may operate synergistically because altering the wettability of the formation to mixed-wet or water-wet may enhance the ability of the chelating agent to complex metal ions. As used herein, the term "water-wet," and all grammatical variants thereof, refers to the preference of a solid to contact a water phase rather than an oil phase. As used herein, the term "oil-wet," and all grammatical variants thereof, refers to the preference of a solid to contact an oil phase rather than a water phase. As used herein, the term "mixed-wet," and all grammatical variants thereof, refers to an inhomogeneous preference of a solid to contact a water phase and an oil phase, with neither preference as strong as water-wet or oil-wet. Generally, oil-wet formations preferentially imbibe water and water-wet formations have a thin film of water coated thereon, which is desirable for efficient oil transport. Thus, the treatment fluids may reduce or prevent formation damage that may result from the use of other types of fluids.

In some embodiments, the treatment fluids described herein may be introduced into a subterranean formation having a filter cake deposited on a least a portion of the face of the formation. As used herein, the term "filter cake," and all of its grammatical variants, refers to residue deposited on a porous medium (e.g., a formation face) when a slurry, such as a drilling fluid, is forced against the medium (e.g., under pressure). The treatment fluid may contact the filter cake and dissolve at least a portion of it. The dissolved filter cake may be removed from the formation with at least a portion of the treatment fluid (e.g., by circulating the treatment fluid having the dissolved filter cake therein to the surface). The wettability altering surfactant may not only alter the wettability of the formation, but also may alter the wettability of the filter cake, so as to allow the chelating agent to act upon the components of the filter cake and dissolve it.

The wettability altering surfactant described in some embodiments herein may be any surfactant capable of use in the treatment fluid with the chelating agent in a subterranean formation and effective at a pH range above about 5. Suitable wettability altering surfactants may be ionic (e.g., cationic or anionic) or non-ionic and may include, but are not limited to, a gemini surfactant (including the sub-class of gemini surfactants, the acetylenic diol surfactants), a silicone surfactant, a fluorinated surfactant, an amine surfactant, and any combination thereof. In some embodiments, the wettability altering surfactant may be present in the treatment fluids of the present disclosure in an amount in the range of from a lower limit of about 0.001%, 0.01%, 0.1%, 1%, 1.5%, 3%, 4.5%, 6%, 7.5%, 9%, 10.5%, 12%, and 13.5% to an upper limit of about 30%, 28.5%, 27%, 25.5%, 24%, 22.5%, 21%, 19.5%, 18%, 16.5%, 15%, and 13.5% by weight of the treatment fluid, encompassing any value therebetween. In some embodiments, the wettability altering surfactant may be present in the treatment fluids of the present disclosure in an amount in the range of about 0.01% to about 20%, or in the range of about 0.01% to about 10%.

Gemini surfactants suitable for use as the wettability altering surfactants of the present disclosure may be any gemini surfactant capable of use in a subterranean formation operation. Gemini surfactants may comprise two surfactant molecules chemically bound together by a spacer. The two surfactant molecules may be cationic, anionic, or nonionic, having a tail portion that may be short or long, and any combination of these. The spacer may similarly be short, long, rigid, or flexible. The location of the spacer may further be at any location on the two surfactant molecules sufficient to join them together, and the location of the spacer with reference to one of the surfactant molecules may be, but need not be, the same as the location of the spacer with reference to the other surfactant molecule. Examples of gemini surfactants may include, but are not limited to, those having the following formulae:

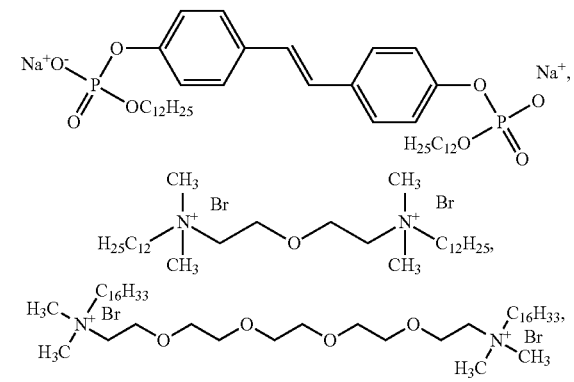

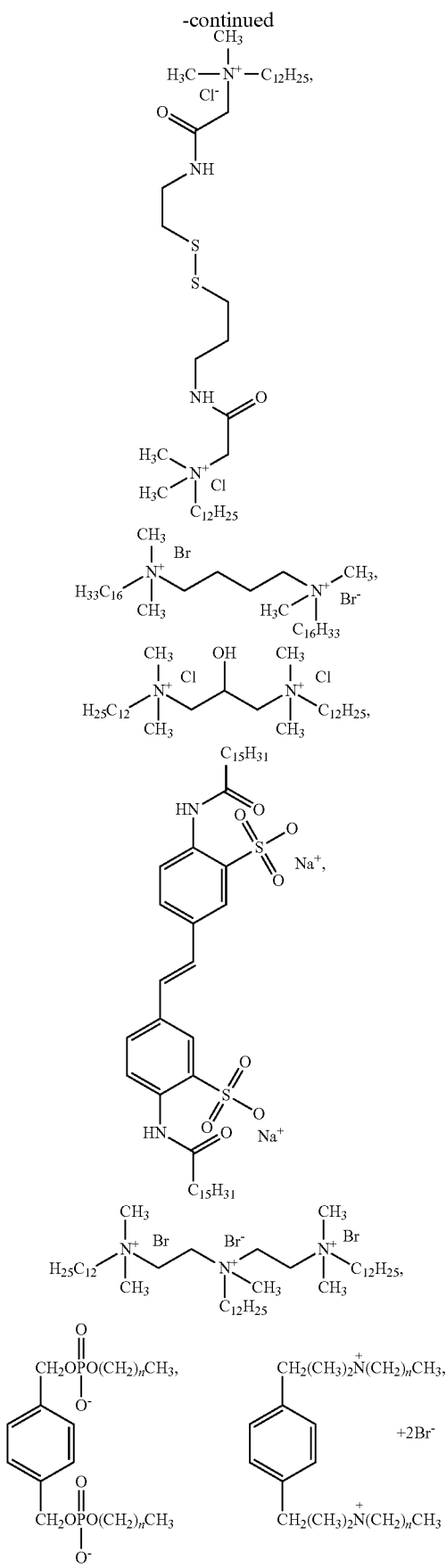

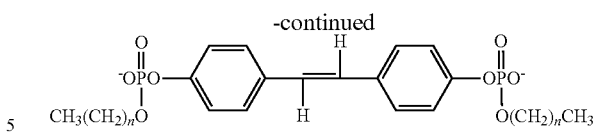

Where applicable, n may be from about 1 to about 20 carbon atoms. Combinations of these gemini surfactants may also be suitable.

In some embodiments, the wettability altering surfactant may be an acetylenic diol surfactant, a sub-class of gemini surfactants. Generally, the acetylenic diol surfactant may have a portion of its chemical structure represented by the formula HO—$R^1$, $R^2C$—C≡C—$CR^1$, $R^2$—OH, where $R^1$ and $R^2$ are alkyl groups having between about 1 and about 20 carbons and may be the same or different. Suitable acetylenic diol surfactants may include, but are not limited to, an acetylenic diol with free hydroxyls, an alkoxylated acetylenic diol surfactant, an ethoxylated acetylenic diol surfactant, a polyethoxylated acetylenic diol surfactant, and any combination thereof. Specific examples of acetylenic diol surfactants for use in the embodiments described herein my include, but are not limited to, 2,4,7,9-tetramethyl-5-decyne-4,7-diol; 2,5,8,11-tetramethyl-6-dodecyne-5,8-diol; polyethoxylated variants thereof; and any combination thereof. Suitable commercially available acetylenic diol surfactants may include, but are not limited to, Dynol® 604, Dynol® 607, and any combination thereof, each available from Air Products and Chemicals, Inc. in Allentown, Pa.

Suitable commercially available gemini surfactants may include, but are not limited to, Surfynol® 104, Dynol® 800, Dynol® 810, EnviroGem® 360, EnviroGem® AD01, and combinations thereof, each available from Air Products and Chemicals, Inc. in Allentown, Pa. Other suitable gemini surfactants may be envisioned by one having ordinary skill in the art for use in the embodiments described herein.

The wettability altering surfactants of the present disclosure may include silicone surfactants. The silicone surfactants may be formed using silicone as a hydrophobe with other additional functional groups. The silicone surfactants described herein are intended to encompass siloxane-based surfactants, siloxanes being functional groups that form the backbone of silicones. Suitable silicone surfactants may include, but are not limited to, an ethoxylated 3-hydroxypropylheptamethyltrisiloxane, an ethoxylated silicone polyether, a polyalkyleneoxide modified heptamethyltrisiloxane, a polydimethylsiloxane, a polyalkyleneoxide polysiloxane, and any combination thereof. Suitable commercially available silicone surfactants may include, but are not limited to Dynol® 960 and Dynol® 980, available from Air Products and Chemicals, Inc. in Allentown, Pa. and Dow Corning® 67, Dow Corning® 500W, Dow Corning® 501W, and Dow Corning® 502W, available from Dow Corning in Midland, Mich. Combinations of these commercially available silicone surfactants may also be suitable for use in the embodiments described herein.

In some embodiments, the wettability surfactant may be a fluorinated surfactant. The fluorinated surfactants described herein may also be referred to as "fluorosurfactants." Such fluorinated surfactants have multiple fluorine atoms (i.e., "polyfluorinated") or fluorocarbon-based (i.e., "perfluorinated"). Suitable fluorinated surfactants may include, but are not limited to, a perfluoroalkyl betaine (e.g., a perfluorohexane ethyl sulfonyl betaine), a perfluoroalkyl sulfonic acid, a perfluoroalkyl carboxylic acid, a perfluoroalkyl phosphonic acid, a perfluoroalkyl phosphine acid, a perfluorobutanesulfonic acid, and any combination thereof. Suitable commercially available fluorinated surfactants may include, but are not limited to, any of the various Capstone® fluorinated surfactants (e.g., 1157, 1157D, 1157N, 1183, 1430, 1440, 1460, 1470, and 1490) and combinations thereof, available from DuPont™ in Wilmington, Del.

The wettability surfactant for use in the treatment fluids described herein may be an amine surfactant. Suitable amine surfactants may include, but are not limited to, an amine ethoxylate surfactant, an amine ethoxylated quaternary salt surfactant, and any combination thereof. A preferred amine surfactant may include tallow trimethylammonium chloride, for example. A suitable commercially available amine surfactant may include, but is not limited to, Arquad T-50, available from Akzo Nobel in Amsterdam, Kingdom of the Netherlands.

The treatment fluids of the embodiments described herein comprise a wettability surfactant and a chelating agent capable of complexing metal ions. The chelating agent may be any chelating agent capable of use in a subterranean formation at pH ranges equal to or above about 5. Such chelating agents may preferably be sugar based chelating agents, which remain capable of high chelation functionality at high pH ranges. Suitable examples of chelating agents that may be used in the treatment fluids described in the present disclosure may include, but are not limited to, a sugar acid, a monosaccharide sugar, a disaccharide sugar, a trisaccharide sugar, and any combination thereof. In some preferred embodiments, the chelating agent may be a sugar acid or a salt of a sugar acid. Suitable sugar acids may be selected from the aldonic acid family of sugar acids obtained by oxidation of the aldehyde functional group of an aldose to form a carboxylic functional group, salts thereof (e.g., a gluconate, such as sodium gluconate, potassium gluconate, ammonium gluconate, and any combination thereof), and combinations thereof. Other sugar acids may include ulosonic acids, uronic acids, aldaric acids, any in combination with an aldonic acid and/or salt of aldonic acid, and any combination thereof. Examples of specific sugar acids for use as the chelating agent in the treatment fluids described herein may include, but are not limited to, gluconic acid, ascorbic acid, glyceric acid, xylonic acid, neuraminic acid, ketodeoxyoctulosonic acid, glucuronic acid, galacturonic acid, iduronic acid, tartaric acid, music acid, saccharic acid, and any combination thereof.

The monosaccharide sugars for use as chelating agents may be composed of about 2 to about 7 carbon atom chains including, for example, glucose, fructose, galactose, isomers thereof, and any combination thereof. Disaccharide sugars for use as chelating agents may include, but are not limited to, sucrose, lactulose, lactose, maltose, trehalose, celloboise, and any combination thereof. Suitable trisaccharide sugars for use as chelating agents in the embodiments described herein may include, isomaltotriose, nigerotriose, maltotriose, melezitose, maltotriulose, raffinose, kestose, and any combination thereof. In some embodiments, lactose may be a preferred sugar for use as a chelating agent in the treatment fluids herein.

In some embodiments, the one or more chelating agents may be present in the treatment fluids described herein in an amount in the range of from a lower limit of about 0.001%, 0.01%, 0.1%, 1%, 2%, 3%, 4%, 5%, 6%, 7%, 8%, and 9% to an upper limit of about 20%, 19%, 18%, 17%, 16%, 15%, 14%, 13%, 12%, 11%, 10%, and 9% by weight of the treatment fluid, and encompassing any value therebetween. In some embodiments, the chelating agents may be present in the treatment fluids of the present disclosure in an amount in the range of about 0.01% to about 20%, or in the range of about 0.01% to about 10%.

In some embodiments, the treatment fluids may further comprise an ortho-dihydroxybenzene compound. The ortho-dihydroxybenzene compound may be synergistically used in the treatment fluids described herein to solubilize certain formation damage compositions (e.g., silicates) and aid in removing them from the formation, thereby further reducing formation damage while the treatment fluid is in use. The ortho-dihydroxybenzene compound may comprise at least one compound selected from the group consisting of a flavanoid, a flavanol, a flavonol, a flavonodid, a catechin, a tannin, an anthocyanidin, an isoflavanoid, derivatives thereof, and combinations thereof. Suitable examples of ortho-dihydroxybenze compounds for use in the treatment fluids of the present disclosure may include, but are not limited to, catechol, pyrogallol, 1,2,4-benzenetriol, 2,4,5-trihydroxybenzoic acid, 3,4,5-trihydroxybenzoic acid (gallic acid), 2,3,4-trihydroxybenzoic acid, 2,3-dihydroxybenzoic acid, 3,4-dihydroxybenzoic acid, 6,7-dihydroxycoumarin, ellagic acid, urushiols, chlorogenic acid, caffeic acid, and any combination thereof. In some embodiments, the ortho-dihydroxybenzene compound may be present in the range of from a lower limit of about 0.01%, 0.1%, 1%, 2%, 3%, 4%, 5%, 6%, 7%, 8%, 9%, 10%, 11%, 12%, 13%, 14%, and 15% to an upper limit of about 30%, 29%, 28%, 27%, 26%, 25%, 24%, 23%, 22%, 21%, 20%, 19%, 18%, 17%, 16%, and 15% by weight of the treatment fluid, and encompassing any value therebetween.

The treatment fluids may, in some embodiments, further comprise an additive designed to aid in completion of a particular subterranean formation treatment operation. Suitable additives that may be included in the treatment fluids of the present disclosure may include, but are not limited to, silica scale control additives, surfactants, gel stabilizers, anti-oxidants, polymer degradation prevention additives, relative permeability modifiers, scale inhibitors, corrosion inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, biocides, clay stabilizers, breakers, delayed release breakers, and the like. Combinations of these additives can be used as well. Given the benefit of the present disclosure, one of ordinary skill in the art will be able to formulate a treatment fluid having properties suitable for a given application.

The treatment fluids of the present disclosure may be used in any subterranean formation operation including, but not limited to, drilling operations, stimulation operations, production operations, remediation operations, sand control operations, and the like. In some embodiments, the treatment fluid may be circulated during a drilling operation in the subterranean formation (e.g., the treatment fluid may be circulated simultaneously while a drill bit drills a wellbore in the formation) to reduce or prevent formation damage that typically occurs during drilling operations. In some embodiments, the treatment fluids described herein may be utilized in matrix dissolution operations. That is, in some embodiments, the treatment fluids described herein may be introduced to a subterranean formation below a fracture gradient pressure of the subterranean formation. In other embodiments, the treatment fluids described herein may be introduced to a subterranean formation at or above a fracture gradient pressure of the subterranean formation, such that one or more fractures are created or enhanced in the subterranean formation as a result of the treatment. Given the benefit of the present disclosure and the understanding of one having ordinary skill in the art, one can readily determine whether to introduce the treatment fluids to a subterranean formation at matrix flow rates (i.e., below the fracture gradient pressure) or at fracturing flow rates (i.e., at or above the fracture gradient pressure).

As used herein, the term "fracture gradient pressure" refers to an equivalent fluid pressure sufficient to create or enhance one or more fractures in the subterranean formation. As used herein, the "fracture gradient pressure" of a layered formation also encompasses a parting fluid pressure sufficient to separate one or more adjacent bedding planes in a layered formation. It should be understood that one of ordinary skill in the art may perform a simple leak-off test on a core sample of a formation to determine the fracture gradient pressure of a particular formation.

As used herein, the term "fracture" refers to a crack, delamination, surface breakage, separation, crushing, rubblization, or other destruction within a geologic formation or fraction of formation not related to foliation or cleavage in metamorphic formation, along which there has been displacement or movement relative to an adjacent portion of the formation. A fracture along which there has been lateral displacement may be termed a fault. When walls of a fracture have moved only normal to each other, the fracture may be termed a joint. Fractures may enhance permeability of rocks greatly by connecting pores together, and for that reason, joints and faults may be induced mechanically in some reservoirs in order to increase fluid flow.

In various embodiments, systems may be configured for delivering the surface modification agent emulsions in any form described herein (e.g., alone, diluted in a treatment fluid, coated onto a particulate, and the like) to a downhole location. In various embodiments, the systems can comprise a pump fluidly coupled to a tubular, the tubular containing the surface modification agent emulsions. The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the surface modification agent emulsions to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the surface modification agent emulsions to the high pressure pump. In such embodiments, the low pressure pump may "step up" the pressure of the surface modification agent emulsions before it reaches the high pressure pump.

In some embodiments, the systems described herein can further comprise a mixing tank that is upstream of the pump and in which the surface modification agent emulsion is formulated. In various embodiments, the pump (e.g., a low pressure pump, a high pressure pump, or a combination thereof) may convey the surface modification agent emulsions from the mixing tank or other source of the surface modification agent emulsions to the tubular. In other embodiments, however, the surface modification agent emulsions can be formulated offsite and transported to a worksite, in which case the surface modification agent emulsions may be introduced to the tubular via the pump directly from its shipping container (e.g., a truck, a railcar, a barge, or the like) or from a transport pipeline. In either case, the surface modification agent emulsions may be drawn into the pump, elevated to an appropriate pressure, and then introduced into the tubular for delivery downhole.

FIG. 1 shows an illustrative schematic of a system that can deliver surface modification agent emulsions of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a surface modification agent emulsion of the present disclosure may be formulated. The surface modification agent emulsions may be conveyed via line 12 to wellhead 14, where the surface modification agent emulsions enter tubular 16, tubular 16 extending from wellhead 14 into subterranean formation 18. Upon being ejected from tubular 16, the surface modification agent emulsions may subsequently penetrate into subterranean formation 18. In some instances, tubular 16 may have a plurality of orifices (not shown) through which the surface modification agent emulsions of the present disclosure may enter the wellbore proximal to a portion of the subterranean formation 18 to be treated. In some instances, the wellbore may further comprise equipment or tools (not shown) for zonal isolation of a portion of the subterranean formation 18 to be treated.

Pump 20 may be configured to raise the pressure of the surface modification agent emulsions to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the surface modification agent emulsions may, in some embodiments, flow back to wellhead 14 and exit subterranean formation 18. In some embodiments, the surface modification agent emulsion that has flowed back to wellhead 14 may subsequently be recovered and recirculated to subterranean formation 18.

It is also to be recognized that the disclosed surface modification agent emulsions may also directly or indirectly affect the various downhole equipment and tools that may come into contact with the surface modification agent emulsions during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: providing a treatment fluid comprising a base fluid, a wettability altering surfactant, and a chelating agent, wherein the treatment fluid has a pH of at least about 5; introducing the treatment fluid into a subterranean formation; altering a wettability of the subterranean formation from oil-wet to either mixed-wet or water-wet with the wettability altering surfactant; and complexing metal ions in the subterranean formation with the chelating agent.

B. A method comprising: providing a treatment fluid comprising a base fluid, a wettability altering surfactant, and a chelating agent, wherein the treatment fluid has a pH of at least about 5; introducing the treatment fluid into a subterranean formation, wherein the subterranean formation has a filter cake deposited on at least a portion of the subterranean formation; contacting the filter cake with the treatment fluid; altering a wettability of the subterranean formation from oil-wet to either mixed-wet or water-wet with the wettability altering surfactant; dissolving at least a portion of the filter cake by complexing metal ions in the filter cake with the chelating agent; and removing at least a portion of the treatment fluid and the dissolved filter cake from the subterranean formation.

Each of embodiments A and B may have one or more of the following additional elements in combination:

Element 1: Wherein the wettability altering surfactant is present in an amount of about 0.001% to about 30% by weight of the treatment fluid.

Element 2: Wherein the chelating agent is present in an amount of about 0.001% to about 20% by weight of the treatment fluid.

Element 3: Wherein the wettability altering surfactant is selected from the group consisting of a gemini surfactant, a silicone surfactant, a fluorinated surfactant, an amine surfactant, and any combination thereof.

Element 4: wherein the gemini surfactant is selected from the group consisting of:

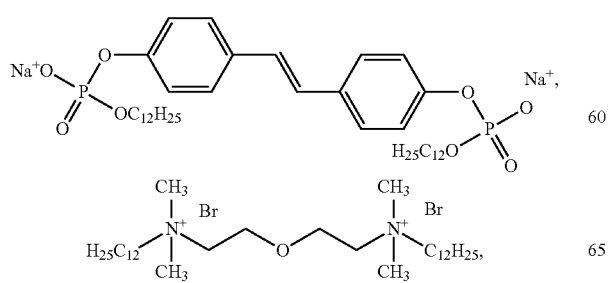

-continued

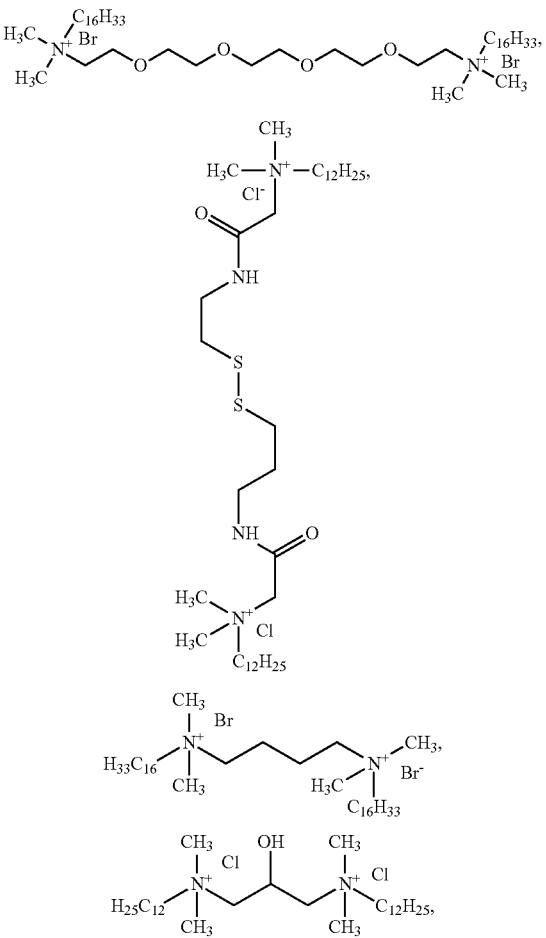

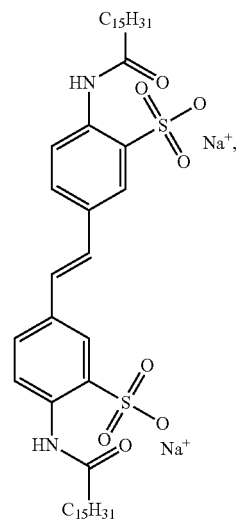

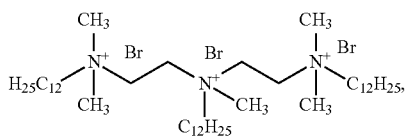

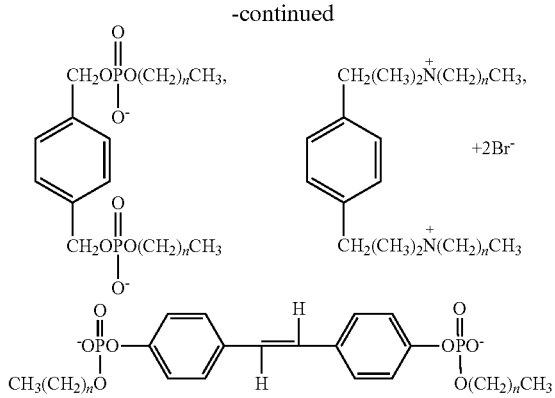

-continued and any combination thereof, and wherein n is between about 1 to about 20 carbon atoms.

Element 5: Wherein the gemini surfactant is an acetylenic diol surfactant selected from the group consisting of an acetylenic diol with free hydroxyls, an alkoxylated acetylenic diol surfactant, an ethoxylated acetylenic diol surfactant, a polyethoxylated acetylenic diol surfactant, and any combination thereof.

Element 6: Wherein the silicone surfactant is selected from the group consisting of an ethoxylated 3-hydroxypropylheptamethyltrisiloxane, an ethoxylated silicone polyether, a polyalkyleneoxide modified heptamethyltrisiloxane, a polydimethylsiloxane, a polyalkyleneoxide polysiloxane, and any combination thereof.

Element 7: Wherein the fluorinated surfactant is selected from the group consisting of a perfluoroalkyl betaine, a perfluoroalkyl sulfonic acid, a perfluoroalkyl carboxylic acid, a perfluoroalkyl phosphonic acid, a perfluoroalkyl phosphine acid, a perfluorobutanesulfonic acid, and any combination thereof.

Element 8: Wherein the amine surfactant is selected from the group consisting of an amine ethoxylate surfactant, an amine ethoxylated quaternary salt surfactant, and any combination thereof.

Element 9: Wherein the chelating agent is selected from the group consisting of a sugar acid, a salt of a sugar acid, a monosaccharide sugar, a disaccharide sugar, a trisaccharide sugar, and any combination thereof.

Element 10: Wherein the treatment fluid further comprises an ortho-dihydroxybenzene compound.

Element 11: Wherein the treatment fluid is introduced into the subterranean formation by circulating the treatment fluid during a drilling operation.

Element 12: Further comprising a wellhead with a tubular extending therefrom and into the subterranean formation and a pump fluidly coupled to the tubular, wherein the step of: introducing the treatment fluid into the subterranean formation comprises introducing the treatment fluid through the tubular.

By way of non-limiting example, exemplary combinations applicable to A and B include: A with 1 and 2; A with 3 and 6; A with 3, 8, and 10; B with 1 and 9; B with 3, 5, and 7; B with 2 and 12.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A and B" or "at least one of A or B" each refer to only A, only B, or only C; any combination of A, B, and C; and/or at least one of each of A, B, and C.

The invention claimed is:
1. A method comprising:
providing a treatment fluid comprising a base fluid, a wettability altering surfactant, and a chelating agent, wherein the treatment fluid has a pH of at least about 5; wherein the wettability altering surfactant is selected from the group consisting of the following gemini surfactants:

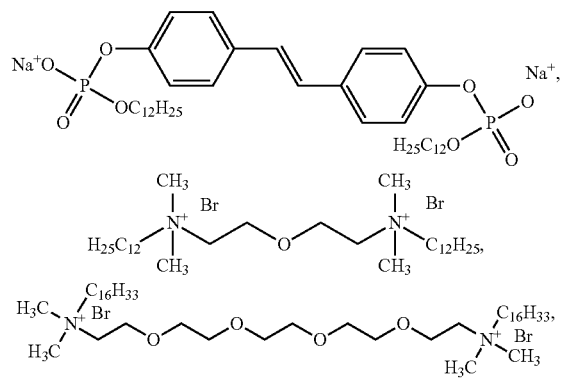

-continued

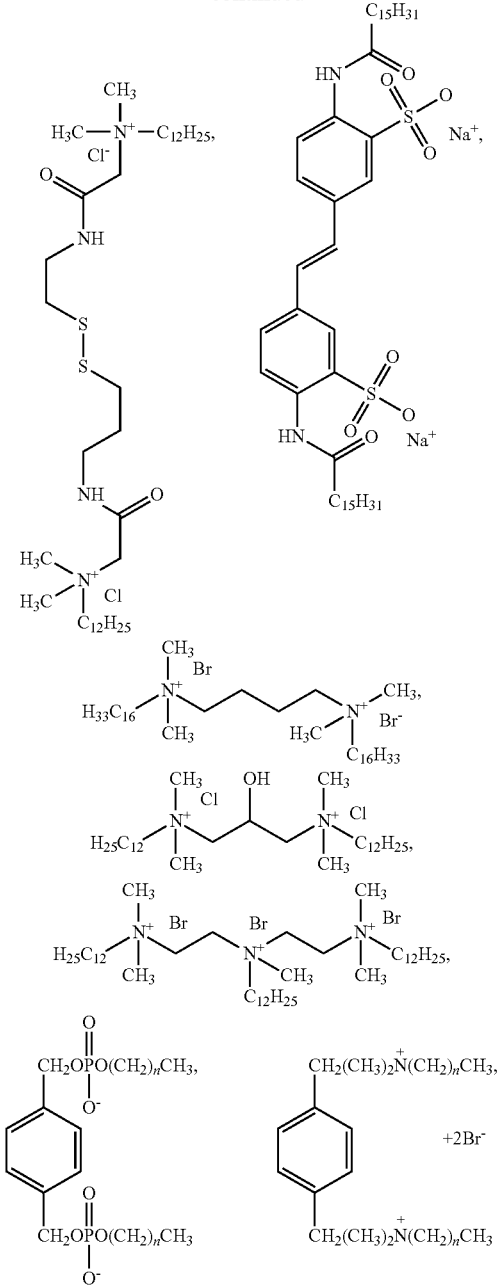

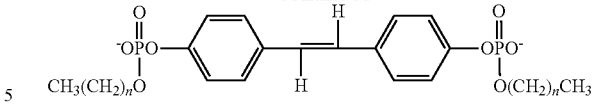

and any combination thereof;

introducing the treatment fluid into a subterranean formation, wherein the subterranean formation has a filter cake deposited on at least a portion of the subterranean formation;

contacting the filter cake with the treatment fluid thereby altering a wettability of the filter cake so as to allow the chelating agent to act upon the filter cake;

altering a wettability of the subterranean formation from oil-wet to either mixed-wet or water-wet with the wettability altering surfactant;

dissolving at least a portion of the filter cake by complexing metal ions in the filter cake with the chelating agent, wherein the chelating agent is selected from the group consisting of a sugar acid, a salt of a sugar acid, a monosaccharide sugar, a disaccharide sugar, a trisaccharide sugar, and any combination thereof; and removing at least a portion of the treatment fluid and the dissolved filter cake from the subterranean formation.

2. The method of claim 1, wherein the wettability altering surfactant is present in an amount of about 0.001% to about 30% by weight of the treatment fluid.

3. The method of claim 1, wherein the chelating agent is present in an amount of about 0.001% to about 20% by weight of the treatment fluid.

4. The method of claim 1, wherein the treatment fluid further comprises an ortho-dihydroxybenzene compound.

5. The method of claim 1, further comprising a wellhead with a tubular extending therefrom and into the subterranean formation and a pump fluidly coupled to the tubular, wherein the step of: introducing the treatment fluid into the subterranean formation comprises introducing the treatment fluid through the tubular.

6. The method of claim 1, wherein the treatment fluid is introduced into the subterranean formation by circulating the treatment fluid during a drilling operation.

* * * * *